UNITED STATES PATENT OFFICE.

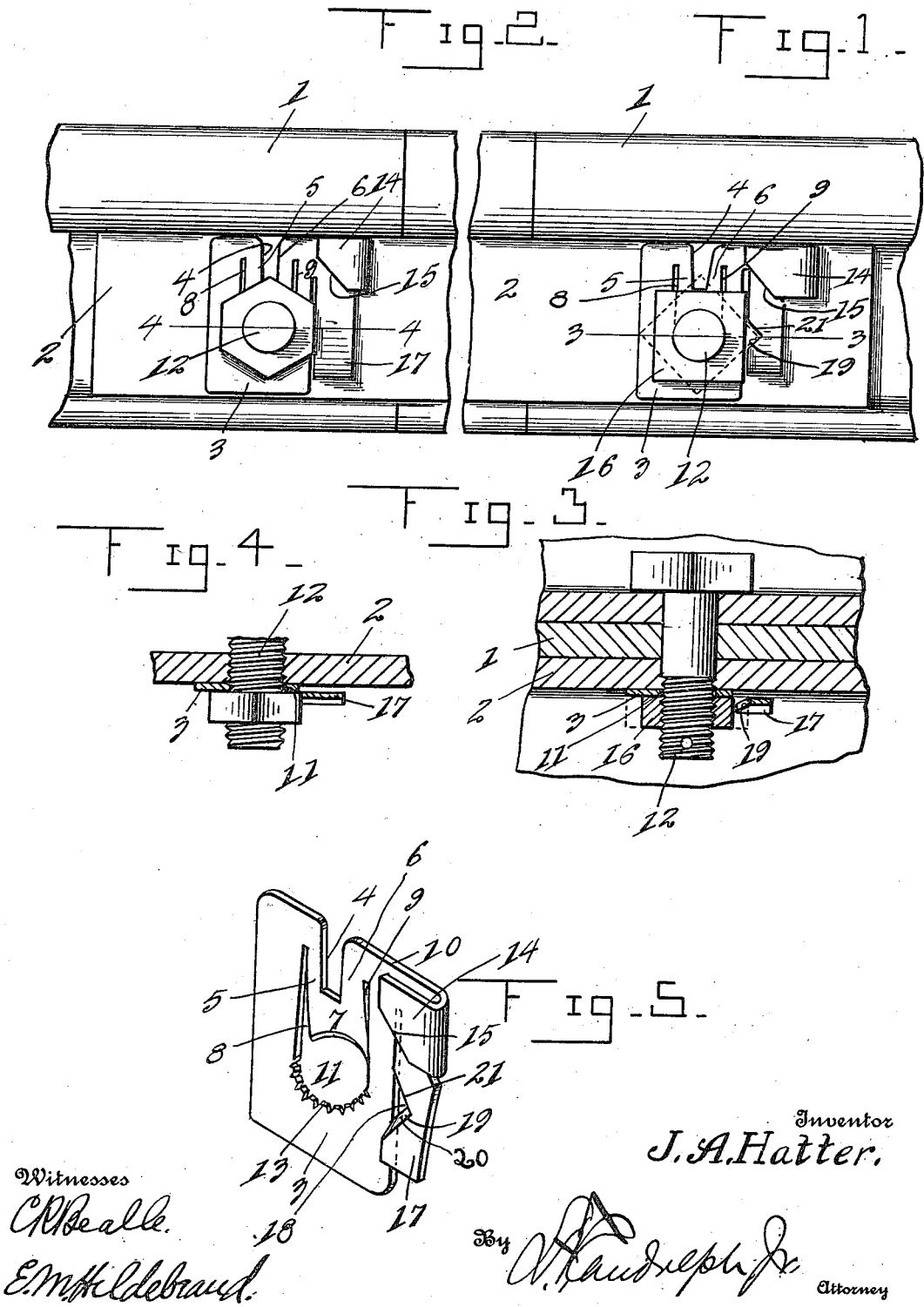

JOHN ANDREW HATTER, OF VICKSBURG, MISSISSIPPI, ASSIGNOR OF ONE-HALF TO NATHANIEL VICK ROBBINS, OF VICKSBURG, MISSISSIPPI.

BOLT AND NUT LOCK.

1,081,668.  Specification of Letters Patent.  Patented Dec. 16, 1913.

Application filed May 12, 1913. Serial No. 767,131.

*To all whom it may concern:*

Be it known that I, JOHN A. HATTER, a citizen of the United States, residing at Vicksburg, in the county of Warren and State of Mississippi, have invented certain new and useful Improvements in Bolt and Nut Locks; and I do hereby declare the following to be a full, clear, and exact description of the invention, such as will enable others skilled in the art to which it appertains to make and use the same.

This invention relates to new and useful improvements in nut locks, and as its principal object aims to provide a simple, inexpensive, and efficient device of this character which is practically capable of universal application and may be readily applied to a bolt to positively lock the nut against rotation.

A further object is to provide a nut lock equipped with simple means for facilitating the removal of the nut when occasion demands.

A yet further object is to construct the device designed for facilitating the removal of the nut in such manner that any screw driver, cold chisel, or similar and common tool may be readily employed in disengaging the nut from the bolt.

A further object of equal importance with the foregoing resides in the provision of a nut lock which, as well as holding the nut against rotation on the bolt, will further act to prevent the rotation of the bolt in the structure to which it is applied.

The above and additional objects are accomplished by such means as are illustrated in the accompanying drawings, described in the following specification, and then more particularly pointed out in the claim which is appended hereto and which forms a part of this application.

With reference to the drawings, wherein I have illustrated the preferred form of my invention as it is reduced to practice, and throughout the several views of which similar reference numerals designate corresponding parts: Figure 1 is a front elevation, illustrating the preferred form of the nut lock in assembled relation to a rail. Fig. 2 is a similar view illustrating the modified form of this invention, designed to lock a square nut on a bolt. Fig. 3 is a section on the line 3—3 of Fig. 1. Fig. 4 is a section on the line 4—4 of Fig. 2. Fig. 5 is a detail view illustrating in perspective the locking washer.

Proceeding now to the description of the drawings, the numerals 1 and 2 designate respectively the rail and fish plate in connection with which the nut lock of this invention is illustrated.

It will of course be understood that while the nut lock has been designed with particular reference to the needs of rail joints, and will be hereinafter described in that connection, it may, nevertheless, be applied to the bolts of any other structure with equal efficiency.

The lock of this invention is in the nature of a locking plate or washer, designated as an entirety in Fig. 1 by the numeral 3. In Fig. 1, wherein is illustrated the preferred embodiment of this invention, the main body portion of the plate 3 is preferably rectangular in shape, and is bifurcated as at 4 to increase the elasticity of the arms 5 and 6 of the yoke 7. The yoke 7 is produced by slitting the plate along two parallel longitudinally extending lines 8 and 9, which terminate at one end adjacent the end edge 10 of the plate, and at their other ends communicate with and are approximately tangent to a circular opening 11, designed to receive the bolt 12. The lower edge of the opening 11 is notched to produce gripping teeth 13, the application of which will be hereinafter fully disclosed. Projecting laterally from the uper end of the plate 3, is a tongue 14, which is bent to produce a substantially U-shaped conformation, and is cut-away diagonally, as at 15, to permit the unobstructed rotation of the nut, designated in Fig. 1 by the numeral 16. Formed integrally with the tongue 14 and extending in parallel relation to the adjacent longitudinal edge of the plate 3 is a locking pawl 17, which is cut away from its inner edge to produce a V-shaped notch, as at 18, the edge 19 of which is beveled as at 20. This bottom edge 19 of the notch is remote from the tongue 14, for a purpose which will be hereinafter disclosed. The tongue 17 is bent at its fixed terminal to lie in an inclined plane with respect to the plate 3. The yoke arms 5 and 6 are bent to dispose the member 7 at an angle to the plane of the member 3. The inclination of the members 7 and 17 is opposed as regards their relation to the plane of the plate 3.

The modified form of this invention, illustrated in Fig. 2, differs from the preferred form only in that it is designed for usage with a nut of the hexagonal type. The notched portion 18 of the preferred form has therefore been eliminated in the modified form, inasmuch as the inner edge of the locking pawl of the modified form will itself serve to hold the nut against negative rotation.

The actual construction of the locking plate or washer being thus disclosed, it now remains to describe the manipulation of the device when employed in locking the nut against rotation on the bolt. Briefly, the operation is as follows: The bolt is projected through the opening and the washer is applied to dispose the shank of the bolt within the opening 11. The nut is then threaded on the shank of the bolt, and as it approaches home position, it engages the member 3. In the preferred embodiment of this invention, in which a square nut is employed, the corners of the nut strike the inclined face of the member 17 and ride upwardly therealong until the nut has been turned to bring one of its corners to a position which will cause it to engage the V-shaped notch 18 whereupon it will be locked. While the nut is being rotated, the member 7 will engage the face of the fish plate or other structure to which the bolt has been applied, and the member 3 will be pressed against the fish plate. In this manner, a severe binding engagement will be occasioned between the curved edge 20 of the member 7, and the teeth 13 with the shank of the bolt, thus holding the bolt against rotation. It will be apparent that when the nut has reached home, it will be held against negative rotation by reason of the fact that a negative turn of the nut will serve to engage one edge of the nut with the straight edge 21 of the V-shaped notch 18.

As regards the manipulation of a nut of the hexagonal type which is employed in the modified form of this invention, it will be observed that as the nut approaches home position, it will ride over the inclined face of the locking pawl, depressing this member each time a corner of the nut passes. It will also be noted that when the nut has reached home, it will be held against negative rotation by reason of the fact that an edge of the nut will engage the adjacent longitudinal edge of the locking pawl.

When necessary, the nut may be readily removed by inserting a cold chisel, screw driver, or similar tool, through the U-shaped tongue 14, and pressing down the locking pawl 17 to throw the straight edge 21 out of engagement with the nut.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

A nut lock comprising a rectangular plate having a circular opening formed therethrough centrally of the plate and adapted to receive the bolt shank, a resilient tongue formed in the plate adjacent the opening by slitting the plate, said tongue adapted to engage the member to which said plate is applied in advance of said plate, a U-shaped tool engaging member formed integrally with said plate at one end of one of the longitudinal edges thereof, an angularly disposed locking tongue formed integral with said U-shaped member and disposed in spaced relation to the adjacent longitudinal edge of the plate, said locking tongue notched intermediate its ends to receive one of the corners of the nut and said U-shaped tool engaging member provided with a beveled face to facilitate the rotation of the nut.

In testimony whereof I affix my signature in presence of two witnesses.

JOHN ANDREW HATTER.

Witnesses:
FLORA TUCKER,
HARRY S. HINDS.

---

Copies of this patent may be obtained for five cents each, by addressing the "Commissioner of Patents, Washington, D. C."